United States Patent
Krull et al.

(10) Patent No.: US 6,599,335 B1
(45) Date of Patent: Jul. 29, 2003

(54) COPOLYMERS BASED ON ETHYLENE AND UNSATURATED CARBOXYLIC ESTERS AND THEIR USE AS MINERAL OIL ADDITIVES

(75) Inventors: Matthias Krull, Oberhausen (DE); Markus Kupetz, Dinslaken (DE); Raimund Wildfang, Oberhausen (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/706,656

(22) Filed: Nov. 6, 2000

Related U.S. Application Data

(63) Continuation of application No. 09/111,214, filed on Jul. 7, 1998.

(30) Foreign Application Priority Data

Jul. 8, 1997 (DE) .......................................... 197 29 057

(51) Int. Cl.$^7$ ................................................. C10L 1/18
(52) U.S. Cl. ............................. 44/386; 44/393; 208/15; 208/18
(58) Field of Search ................. 44/393, 386; 526/331; 208/36, 15, 17, 18, 19

(56) References Cited

U.S. PATENT DOCUMENTS

| | | | | |
|---|---|---|---|---|
| 2,473,996 A | * | 6/1949 | Hanford | 526/326 |
| 3,048,479 A | | 8/1962 | Ilnyckyj et al. | |
| 3,145,194 A | * | 8/1964 | Heikmaier et al. | 526/326 |
| 3,394,114 A | * | 7/1968 | Anderson | 526/331 |
| 3,562,229 A | * | 2/1971 | Bauer et al. | 526/331 |
| 3,640,834 A | * | 2/1972 | Oberst et al. | 526/331 |
| 4,129,714 A | * | 12/1978 | Colburn et al. | 526/331 |
| 4,211,534 A | | 7/1980 | Feldman | |
| 4,261,703 A | * | 4/1981 | Tack et al. | 44/374 |
| 4,670,516 A | | 6/1987 | Sackmann et al. | |
| 4,713,088 A | | 12/1987 | Tack et al. | |
| 4,802,892 A | | 2/1989 | Shimada et al. | |
| 4,985,048 A | | 1/1991 | Wirtz et al. | 44/394 |
| 5,186,720 A | | 2/1993 | Feustel et al. | |
| 5,254,652 A | * | 10/1993 | Reimann et al. | 526/331 |
| 5,391,632 A | | 2/1995 | Krull et al. | |
| 5,492,990 A | * | 2/1996 | Hobes et al. | 526/324 |
| 5,492,991 A | * | 2/1996 | Hobes et al. | 526/324 |
| 6,090,169 A | * | 7/2000 | Krull et al. | 44/395 |
| 6,110,238 A | * | 8/2000 | Krull et al. | 44/393 |

FOREIGN PATENT DOCUMENTS

| | | |
|---|---|---|
| DE | 196 45 603 A1 | 5/1998 |
| EP | 0 99 646 A1 | 2/1983 |
| EP | 0 203 554 A1 | 12/1986 |
| EP | 0217 602 A1 | 4/1987 |
| EP | 0 271 738 A2 | 6/1988 |
| EP | 320 766 * | 6/1989 |
| EP | 493 769 * | 7/1992 |
| EP | 584 651 A * | 3/1994 |
| EP | 0 184 083 A2 | 11/1996 |
| GB | 913715 | 12/1962 |
| GB | 1263 151 | 2/1972 |
| WO | WO 94/00535 | 1/1994 |
| WO | WO 95/23200 | 8/1995 |

OTHER PUBLICATIONS

PCT Search Report for EP 98 111801.
"Comb–Like Polymers, Structure and Properties," N.A.Platé and V.P. Shibaev, J. Polymer Sci.: Macromolecular Reviews, vol. 8, 1974, pp. 117–253.
esp@cenet Abstract for EP0111888 Jun. 27, 1984.
Chemical Abstract, vol. 61 p. 5435 date unknown.

\* cited by examiner

*Primary Examiner*—Margaret Medley
(74) *Attorney, Agent, or Firm*—Susan S. Jackson; Scott E. Hanf

(57) ABSTRACT

Copolymers based on ethylene and unsaturated carboxylic esters and their use as mineral oil additives.

The invention relates to copolymers of low olefins and vinyl esters, containing a) from 85 to 97 mol % of bivalent structural units of the formula 1

$$—CH_2—CR^1R^2— \qquad 1$$

in which $R^1$ and $R^2$, independently of one another, are hydrogen or methyl, and b) at least 3 mol % of bivalent structural units of the formula 2

$$\begin{array}{c} —CH_2—CH— \\ | \\ OCOR^3 \end{array} \qquad 2$$

in which $R^3$ is saturated, branched $C_6–C_{16}$-alkyl which has a tertiary carbon atom, wherein $R^3$ is bonded by its tertiary carbon atom to the carboxyl function.

The copolymers according to the invention are used as flow improvers for mineral oil distillates.

11 Claims, No Drawings

COPOLYMERS BASED ON ETHYLENE AND UNSATURATED CARBOXYLIC ESTERS AND THEIR USE AS MINERAL OIL ADDITIVES

This is a continuation of application Ser. No. 09/111,214, filed Jul. 7, 1998.

BACKGROUND OF THE INVENTION

The present invention relates to copolymers of ethylene and vinyl esters of tertiary carboxylic acids and their use as flow improvers for mineral oils.

Crude oils and middle distillates such as gas oil, diesel oil or heating oil, obtained by distillation of crude oils contain, depending on the origin of the crude oils, different amounts of n-paraffins, which crystallize out as lamellar crystals when the temperature is lowered and in some cases agglomerate with inclusion of oil. This results in a deterioration in the flow properties of these oils or distillates, giving rise to problems, for example in the recovery, transport, storage and/or use of the mineral oils and mineral oil distillates. In the case of mineral oils, this crystallization phenomenon can lead to deposits on the pipe walls during transport through pipelines, especially in the winter, and in individual cases, for example when the pipeline is shut down, even to complete blockage thereof. The precipitation of paraffin can also cause difficulties in storage and further processing of the mineral oils. Thus, it may be necessary in winter to store the mineral oils in heated tanks. In the case of mineral oil distillates, blockage of the filters in diesel engines and furnaces may occur owing to the crystallization, with the result that reliable metering of the fuels is prevented and complete interruption of the fuel or heating medium feed may occur.

In addition to the traditional methods for eliminating the paraffins which have crystallized out (thermally, mechanically or by means of solvents), which relate only to the removal of the precipitates already formed, recent years have seen the development of chemical additives (so-called flow improvers or paraffin inhibitors) which physically interact with the precipitating paraffin crystals and thus modify their shape, size and adhesion properties. The additives act as additional crystal seeds and partially crystallize out with the paraffins, resulting in a larger number of smaller paraffin crystals with modified crystal shapes. A part of the action of the additives is also explained by dispersing of the paraffin crystals. Modified paraffin crystals have less tendency to agglomerate, so that the oils into which these additives have been introduced can be pumped or processed even at temperatures which are often more than 20° lower than in the case of oils not containing additives.

The flow and low-temperature behavior of mineral oils and mineral oil distillates is described by stating the pour point (determined according to ISO 3016) and the cold filter plugging points (CFPP; determined according to EN 116). Both characteristics are measured in ° C.

Typical flow improvers for crude oils and middle oil distillates are copolymers of ethylene with carboxylic esters of vinyl alcohol. Thus, according to DE-A-11 47 799, oil-soluble copolymers of ethylene and vinyl acetate having a molecular weight between about 1,000 and 3,000 are added to mineral oil distillate, or combustion fuels having a boiling point between about 120 and 400° C. Copolymers which contain from about 60 to 99% by weight of ethylene and from about 1 to 40% by weight of vinyl acetate are preferred. They are particularly effective if they were prepared by free radical polymerization in an inert solvent at temperatures of from about 70 to 130° C. and pressures of from 35 to 2,100 atm (gage pressure) (DE-A-19 14 756).

Other polymers used as flow improvers contain, in addition to ethylene and vinyl acetate, for example 1-hexene (cf. EP-A-0 184 083), diisobutylene (cf. EP-A-0 203 554) or an isoolefin of the formula

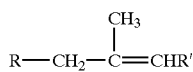

in which R and R' are identical or different and are hydrogen or $C_1$–$C_4$-alkyl radicals (EP-A-0 099 646). Copolymers of ethylene, alkenecarboxylic esters and/or vinyl esters and vinyl ketone are also used as pour point depressants and for improving the flow behavior of crude oils and middle distillates of crude oils (EP-A-0 111 888).

In addition, copolymers based on α,β-unsaturated compounds and maleic anhydride are also used as flow improvers. DE-196 45603 describes copolymers of from 60 to 99 mol % of structural units derived from ethylene and from 1 to 40 mol % of structural units which are derived from maleic acid, its anhydride or its imides. The disadvantage of using such compounds is the complicated preparation process, namely high-pressure mass copolymerization of ethylene and maleic anhydride and subsequent imidation of the anhydride groups.

DE-1 162 630 discloses copolymers of ethylene and vinyl esters of straight-chain fatty acids having 4 to 18 carbon atoms as pour point-depressing additive for mineral oil distillates. Neocarboxylic acids are not mentioned.

EP-A-0 217 602 discloses ethylene copolymers with vinyl esters carrying $C_1$- to $C_{18}$-alkyl radicals as flow improvers for mineral oil distillates having boiling ranges (90–20%) of less than 100° C.

EP-A-0 648 256 discloses, inter alia, copolymers of ethylene and vinyl esters of $C_1$–$C_{28}$-carboxylic acids, but once again no neocarboxylic acids.

EP-A-0 493 769 discloses terpolymers which are prepared from ethylene, vinyl acetate and vinyl neononanoate or neodecanoate and their use as additives for mineral oil distillates.

EP-A-0 584 651 discloses copolymers of ethylene with a tertiary, saturated carboxylic acid for the production of films which have a melt flow index MFI (190/2,16) of from 0.1 to 50 g/10 min. Owing to their high molecular weight and their low solubility, such copolymers are however unsuitable for use as mineral oil additives.

EP-A-0 746 598 discloses copolymers of ethylene and dialkyl fumarates as a mixture with mineral oils which have a cloud point below –10° C.

The efficiency of the known additives for improving the properties of mineral oil fractions is dependent, inter alia, on the origin of the mineral oil from which they were obtained and hence in particular on its composition. Additives which are very suitable for establishing specific properties of fractions of a crude oil can therefore lead to completely unsatisfactory results in distillates of crude oils of another origin.

Additives which have a wide range of use, i.e. which substantially improve the flow properties of mineral oils and mineral oil fractions of different origins at lower temperatures, are now available. Nevertheless, there are cases where they prove to be not very useful or completely useless, for example because they make little contribution to increasing the low-temperature flowability. The reasons for this are varied; the exploitation of raw materials not used to date, the changed processing of the primary products and new market requirements may be mentioned as examples.

In particular, diesel fuels which are distinguished by lower environmental pollution during combustion and are characterized by a very low sulfur content of less than 500 ppm and in particular less than 100 ppm and a low aromatics content can be treated with conventional flow improvers only to an inadequate extent, if at all. Problems are encountered in particular with the winter grades of diesel fuels produced for use under arctic conditions and having extreme low-temperature properties, such as, for example, a cloud point of less than −10° C. and in particular less than −15° C., very narrow distillation cuts having boiling ranges of 20 to 90% by volume less than 100° C., in particular less than 80° C. and in some cases also less than 60° C., and a final boiling point limited to about 360° C. and in particular to about 320° C. The low-temperature properties of such distillates can at present be satisfactorily improved only by adding low-boiling, low-paraffin components, such as, for example, kerosene.

It was therefore the object to develop novel additives for improving the flowability of such mineral oil grades or mineral oil fractions in which the additives of the prior art have only an unsatisfactory action. Furthermore, it was the object to find additives which can be prepared in a process which is less complicated than, for example, that in the case of the imide derivatives of maleic acid as comonomers.

SUMMARY OF THE INVENTION

The present invention achieves this object by providing flow improvers for mineral oils, which contain copolymers of ethylene with the vinyl esters of tertiary carboxylic acids, also referred to below as neocarboxylic acids.

The invention relates to copolymers of low olefins and vinyl esters, containing a) from 85 to 97 mol % of bivalent structural units of the formula 1

$$—CH_2—CR^1R^2—\qquad 1$$

in which $R^1$ and $R^2$, independently of one another, are hydrogen or methyl, and b) at least 3 mol % of bivalent structural units of the formula 2

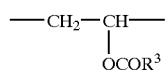

$$—CH_2—CH—\\ \;\;\;\;\;\;\;\;\;|\\ \;\;\;\;\;\;\;\;OCOR^3 \qquad 2$$

in which $R^3$ is saturated, branched $C_6$–$C_{16}$-alkyl which has a tertiary carbon atom, wherein $R^3$ is bonded by its tertiary carbon atom to the carboxyl function.

$R^1$ and $R^2$ are preferably hydrogen. $R^3$ is preferably a neoalkyl radical having 7 to 11 carbon atoms, in particular a neoalkyl radical having 8, 9 or 10 carbon atoms. The neoalkanoic acid from which the abovementioned neoalkyl radicals can be derived are described by the formula 3:

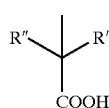

3

R' and R" are alkyl radicals having together preferably 5 to 9, in particular 6, 7 or 8, carbon atoms. The vinyl ester used for the copolymerization accordingly has the formula 4:

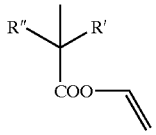

4

The copolymer according to the invention preferably comprises not more than 15, in particular from 5 to 10, mol % of structural units of the formula 2.

DESCRIPTION OF THE PREFERRED EMBODIMENT

The copolymers according to the invention can be prepared by the conventional copolymerization methods, such as, for example, suspension polymerization, solution polymerization, gas-phase polymerization or high-pressure mass polymerization. High-pressure mass polymerization at pressures of, preferably, from 50 to 400, in particular from 100 to 300, MPa and temperatures of, preferably, from 50 to 300° C., in particular from 100 to 250° C., is preferred. The reaction of the monomers is initiated by initiators forming free radicals (free radical chain initiators). This class of substances includes, for example, oxygen, hydroperoxides, peroxides and azo compounds, such as cumyl hydroperoxide, tert-butyl hydroperoxide, dilauroyl peroxide, dibenzoyl peroxide, bis(2-ethylhexyl) peroxydicarbonate, tert-butyl perpivalate, tert-butyl permaleate, tert-butyl perbenzoate, dicumyl peroxide, tert-butyl cumyl peroxide, di(tert-butyl) peroxide, 2,2′-azobis(2-methylpropanonitrile) and 2,2′-azobis(2-methylbutyronitrile). The initiators are used individually or as a mixture comprising two or more substances in amounts of from 0.001 to 20% by weight, preferably from 0.01 to 10% by weight, based on the monomer mixture.

Preferably, the copolymers according to the invention have melt viscosities at 140° C. or from 20 to 10,000 MPas, in particular from 30 to 5000 MPas, especially from 50 to 2000 MPas.

For a given composition of the monomer mixture, the desired melt viscosity of the copolymers is established by varying the reaction parameters pressure and temperature and, if required, by adding moderators. Hydrogen, saturated or unsaturated hydrocarbons, e.g. propane, aldehydes, e.g. propionaldehyde, n-butyraldehyde or isobutyraldehyde, ketones, e.g. acetone, methyl ethyl ketone, methyl isobutyl ketone or cyclohexanone, or alcohols, e.g. butanol, have proven useful as moderators. Depending on the intended viscosity, the moderators are used in amounts of up to 20% by weight, preferably from 0.05 to 10% by weight, based on the monomer mixture.

The comonomers suitable for the preparation of copolymers according to the invention are in particular vinyl neooctanoate, neononanoate, neodecanoate, neoundecanoate and neododecanoate. These esters can be prepared, for example, by vinylation of the neocarboxylic acids obtainable from olefins, CO and $H_2O$ by the Koch carboxylic acid synthesis (Römpp: Chemie-Lexikon, Thieme-Verlag, 9th edition, pages 4881 and 4901).

The copolymers according to the invention may contain up to 4% by weight of vinyl acetate or up to 5 mol % of further comonomers. Such comonomers may be, for example, vinyl esters, vinyl ethers, alkyl acrylates, alkyl methacrylates or higher olefins having at least 5 carbon atoms. Preferred higher olefins are hexene, 4-methylpentene, octene and diisobutylene.

In order to obtain copolymers of the claimed composition, monomer mixtures which, in addition to ethylene and, if required, a moderator, contain from 1 to 50% by weight, preferably from 3 to 40% by weight, of vinyl esters are used.

The different polymerization rates of the monomers are taken into account by virtue of the fact that the composition of the monomer mixture differs from the composition of the copolymer. The polymers are obtained as colorless melts which solidify to waxy solids at room temperature.

The high-pressure mass polymerization is carried out batchwise or continuously in known high-pressure reactors, for example autoclaves or tube reactors; tube reactors have proven particularly useful. Solvents, such as aliphatic and/or aromatic hydrocarbons or hydrocarbon mixtures, benzene or toluene, may be present in the reaction mixture. The solvent-free procedure is preferred. In a preferred embodiment of the polymerization, the mixture comprising the monomers, the initiator and, if used, the moderator is fed to a tube reactor via the reactor inlet and via one or more side branches. The monomer streams may have different compositions here (EP A-0 271 738).

The copolymers according to the invention are added to mineral oils or mineral oil distillates in the form of solutions or dispersions. These solutions or dispersions contain, preferably, from 1 to 90, in particular from 10 to 80, % by weight of the copolymers according to the invention. Suitable solvents or dispersants are aliphatic and/or aromatic hydrocarbons or hydrocarbon mixtures, for example gasoline fractions, kerosene, decane, pentadecane, toluene, xylene, ethylbenzene or commercial solvent mixtures, such as Solvent Naphtha, ®Shellsoll AB, ®Solvesso 150, ®Solvesso 200, ®Exxsol, ®ISOPAR- and ®Shellsol D grades. Mineral oils or mineral oil distillates improved in their rheological properties by the novel polymeric compounds contain from 0.001 to 2, preferably from 0.005 to 0.5, % by weight of copolymer, based on the distillate.

The copolymers according to the invention can be used as flow improvers also in the form of mixtures which comprise polymers of the claimed type but different qualitative and/or quantitative composition and/or different viscosity (measured at 140° C.). The mixing ratio (in parts by weight) of the copolymers can be varied over a wide range and may be, for example, from 20:1 to 1:20, preferably from 10:1 to 1:10. In this way, the flow improvers can be specifically adapted to individual requirements.

For optimizing the efficiency as a flow improver for specific substrates, the copolymers according to the invention can also be used together with one or more oil-soluble coadditives which by themselves improve the cold flow properties of crude oils, lubricating oils or fuel oils, with the same result. Examples of such coadditives are polar compounds which disperse paraffin (paraffin dispersants), and comb-like polymers.

Thus, the novel copolymers can be used as a mixture with paraffin dispersants. These additives reduce the size of the paraffin crystals and prevent the paraffin particles from settling out but ensure that they remain dispersed in colloidal form with substantially reduced tendency to settle out. Oil-soluble polar compounds having ionic or polar groups, e.g. amine salts and/or amides, which are obtained by reacting aliphatic or aromatic amines, preferably long-chain aliphatic amines, with aliphatic or aromatic mono-, di-, tri- or tetracarboxylic acids or anhydrides thereof have proven useful as paraffin dispersants (cf. U.S. Pat. No. 4,211,534). Other paraffin dispersants are copolymers of maleic anhydride and $\alpha,\beta$-unsaturated compounds which, if required, may be reacted with primary monoalkylamines and/or aliphatic alcohols (cf. EP-A-0 154 177), the reaction products of alkenylspirobislactones with amines (cf. EP-A-0 413 279) and, according to EP-A-0 606 055, reaction products of terpolymers based on $\alpha,\beta$-unsaturated dicarboxylic anhydrides, $\alpha,\Gamma$-unsaturated compounds and polyoxyalkenyl ethers of lower unsaturated alcohols.

Finally, in a further embodiment of the invention, the novel copolymers are used together with comb-like polymers as flow improvers. These are understood as being polymers in which hydrocarbon radicals having at least 8, in particular at least 10, carbon atoms are bonded to a polymer skeleton. Preferably, they are homopolymers whose alkyl side chains contain at least 8 and in particular at least 10 carbon atoms. In the case of copolymers, at least 20%, preferably at least 30%, of the monomers have side chains (cf. Comb-like Polymers—Structure and Properties; N. A. Platé and V. P. Shibaev, J. Polym. Sci. Macromolecular Revs. 1974, 8, 117 ff). Examples of suitable comb-like polymers are fumarate/vinyl acetate copolymers (cf. EP-A 0 153 176), copolymers of a $C_6$–$C_{24}$-$\alpha$-olefin and an N—$C_6$- to $C_{22}$-alkylmaleimide (cf. EP-A-0 320 766), and furthermore esterified olefin/maleic anhydride copolymers, polymers and copolymers of $\alpha$-olefins and esterified copolymers of styrene and maleic anhydride.

The mixing ratio (in parts by weight) of the copolymers according to the invention with paraffin dispersants or comb-like polymers is in each case from 1:10 to 20:1, preferably from 1:1 to 10:1.

The novel copolymers and their mixtures with one another and with coadditives can be used alone or together with other additives, for example with dewaxing assistants, corrosion inhibitors, antioxidants, lubricity additives or sludge inhibitors. They reduce CFPP of oils with extreme low-temperature properties in which conventional additives have no action or increase the CFPP.

EXAMPLES

Preparation of the Copolymers According to the Invention

Ethylene and vinyl neodecanoate (=®VeoVa10, Shell Chemicals)(Examples 1 to 4) or vinyl neoundecanoate (=®VeoVa11, Shell Chemicals)(Examples 5 and 6) were polymerized in a high pressure autoclave with the addition of propionaldehyde as chain transfer agent (moderator). For this purpose, the monomer mixture to which bis(2-ethylhexyl) peroxidicarbonate (15% by weight dissolved in mineral spirit) had been added was fed into the reactor at 190° C. under the reaction pressure of 150 MPa. The residence time of the reactants in the autoclave was about 2 minutes. Table 1 lists the polymerization conditions and Table 2 the properties of the terpolymers obtained.

The viscosity was determined according to ISO 3219 using a rotational viscometer (Haake RV 20 with plate-and-cone measuring system) at 140° C.

Before the characterization of the polymers, volatile components were removed by drying the crude products obtained from the reactions, at 150° C. under reduced pressure (10 mbar) for 2 hours.

The content of vinyl neodecanoate was determined by pyrolysis of the polymer. For this purpose, the copolymer is thermally cleaved at 450° C. in a closed system in vacuo.

The pyrolysis product and residue are dissolved in toluene and, after the addition of 2-propanol, titrated potentiometrically with a solution of KOH in ethanol (0.1 mol of KOH per liter of solution) to the equivalence point. The KOH consumption corresponds to the vinyl neodecanoate content.

TABLE 1

Preparation of the copolymers

| Example | Starting materials (% by weight) C$_2$H$_4$ | VeoVa10/11 | Initiator (ppm by weight, based on ethylene) | Moderator (% by weight, based on monomers) | Yield |
|---|---|---|---|---|---|
| 1 | 70 | 30 | 250 | 4.0 | 17% |
| 2 | 60 | 40 | 375 | 3.1 | 18% |
| 3 | 50 | 50 | 450 | 2.4 | 20% |
| 4 | 40 | 60 | 950 | 1.8 | 23% |
| 5 | 60 | 40 | 400 | 5.5 | 19% |
| 6 | 65 | 35 | 350 | 5.5 | 18% |

TABLE 2

Characterization of the copolymers

| Example No. | VeoVa 10/11 % by weight | mol % | V$_{140}$ |
|---|---|---|---|
| 1 | 26.4 | 4.8 | 124 |
| 2 | 34.9 | 7.0 | 203 |
| 3 | 43.3 | 9.7 | 238 |
| 4 | 53.4 | 13.8 | 268 |
| 5 | 37.3 | 7.3 | 84 |
| 6 | 30.1 | 5.4 | 75 |

Efficiency of the Copolymers

Table 3 describes the efficiency of the additives obtained according to the preparation examples as flow improvers for mineral oil distillates on the basis of the CFPP test (Cold Filter Plugging Test according to EN 116) in various distillates from Scandinavian refineries. The additives were used as 50% strength solutions in Solvent Naphtha. The efficiency of a commercial ethylene-vinyl acetate copolymer (EVA copolymer) containing 32% by weight (13.3 mol %) vinyl acetate and having a melt viscosity V$_{140}$ of 125 MPas and that of a commercial ethylene-vinyl acetate-vinyl neodecanoate terpolymer containing 35% by weight (16 mol %) of vinyl acetate and 6% by weight (1.2 mol %) of vinyl neodecanoate and having a melt viscosity V$_{140}$ of 140 MPas are stated for comparison.

TABLE 3

|  | Test oil 1 | Test oil 2 | Test oil 3 | Test oil 4 | Test oil 5 |
|---|---|---|---|---|---|
| Initial boiling point | 195° C. | 127° C. | 190° C. | 183° C. | 192° C. |
| 20% | 226° C. | 193° C. | 219° C. | 226° C. | 218° C. |
| 30% | 232° C. | 204° C. | 227° C. | 237° C. | 225° C. |
| 90% | 280° C. | 318° C. | 291° C. | 330° C. | 288° C. |
| Final boiling point | 311° C. | 334° C. | 318° C. | 354° C. | 310° C. |
| Cloud Point | −30° C. | −23° C. | −24° C. | −9° C. | −28° C. |
| CFPP | −31° C. | −23° C. | −29° C. | −12° C. | −34° C. |

TABLE 4

CFPP efficiency

|  | Test oil 1 | | | | Test oil 2 | | | Test oil 3 | | | Test oil 4 | | | Test oil 5 | | |
|---|---|---|---|---|---|---|---|---|---|---|---|---|---|---|---|---|
|  | 100 ppm | 200 ppm | 400 ppm | 1000 ppm | 100 ppm | 200 ppm | 400 ppm | 100 ppm | 250 ppm | 500 ppm | 50 ppm | 100 ppm | 200 ppm | 50 ppm | 100 ppm | 200 ppm |
| Example 1 | −38 | −39 | −40 | <−40 | −28 | −35 | <−40 | −36 | −38 | −40 |  |  |  |  |  |  |
| Example 2 | −38 | −39 | −40 | <−40 | −28 | <−40 | <−40 | −36 | −38 | −39 | −18 | −20 | −23 | −39 | −39 | <−40 |
| Example 3 | −36 | −38 | <−40 | <−40 | <−40 | <−40 | <−40 |  |  |  |  |  |  |  |  |  |
| Example 4 | −33 | −35 | −38 | <−40 |  |  |  |  |  |  | −16 | −17 | −19 |  |  |  |
| Example 5 | −36 | −38 | −39 | <−40 |  |  |  |  |  |  |  |  |  | −39 | −40 | −40 |
| Example 6 | −38 | −39 | <−40 | <−40 |  |  |  |  |  |  |  |  |  |  |  |  |
| E-VA copolymer | −37 | −35 | −35 | −34 | −26 | −38 | <−40 | −35 | −34 | −34 | −17 | −20 | −22 | −39 | −36 | −35 |
| E-VA-VeoVa terpolymer | −33 | −35 | −35 | −33 | −26 | −35 | −39 | −35 | −34 | −33 | −11 | −15 | −22 | −35 | −34 | −33 |

LIST OF TRADENAMES USED

| Solvent Naphtha ®Shellsol AB ®Solvesso 150 | aromatic solvent mixtures having a boiling range from 180 to 210° C. |
|---|---|
| ®Solvesso 200 | aromatic solvent mixture having a boiling range from 230 to 287° C. |
| ®Exxsol | dearomatized solvents having various boiling ranges, for example ®Exxsol D60: from 187 to 215° C. |
| ®ISOPAR (Exxon) | isoparaffinic solvent mixtures having various boiling ranges, for example ®ISOPAR L: from 190 to 210° C. |
| ®Shellsol D | mainly aliphatic solvent mixtures having various boiling ranges |

What is claimed is:

1. A mineral oil composition comprising a mineral oil or a mineral oil distillate, and from 0.001 to 2% by weight of a copolymer, wherein the copolymer is a copolymer of low olefins and vinyl esters, containing a) from 85 to 97 mol % of bivalent structural units of the formula 1

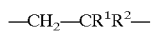     1 in which $R^1$ and $R^2$, independently of one another, are hydrogen or methyl, and b) from 3 to 15 mol % of bivalent structural units of the formula 2

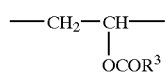     2 in which $R^3$ is saturated, branched $C_6$–$C_{16}$-alkyl which has a tertiary carbon atom, wherein $R^3$ is bonded by its tertiary carbon atom to the carboxyl function.

2. The mineral oil composition as claimed in claim 1, wherein in the formula 1, $R^1$ and $R^2$ are hydrogen.

3. The mineral oil composition as claimed in claim 1, wherein in the formula 2, $R^3$ is a neoalkyl radical having 7 to 11 carbon atoms.

4. The mineral oil composition as claimed in claim 3, wherein in the formula 2, $R^3$ is a neoalkyl radical having 8, 9 or 10 carbon atoms.

5. The mineral oil composition as claimed in claim 1, wherein the copolymer has a melt viscosity at 140° C. of from 20 to 10,000 MPas.

6. The mineral oil composition as claimed in claim 1, wherein the copolymer contains up to 4 mol % of vinyl acetate or up to 5 mol % of further comonomers.

7. The mineral oil composition as claimed in claim 1, wherein the copolymer contains from 5 to 10 mol % of the bivalent structural units of the formula 2.

8. The mineral oil composition as claimed in claim 1 further comprising a paraffin dispersant, a comb-like polymer, or a combination thereof.

9. The mineral oil composition as claimed in claim 5, wherein the copolymer has a melt viscosity at 140° C. of from 30 to 5000 MPas.

10. The mineral oil composition as claimed in claim 9, wherein the copolymer has a melt viscosity at 140° C. of from 50 to 2000 MPas.

11. A method of preparing the mineral oil composition as claimed in claim 1, comprising adding to a mineral oil or a mineral oil distillate from 0.001 to 2% by weight of a copolymer of low olefins and vinyl esters, comprising a) from 85 to 97 mol % of bivalent structural units of the formula 1

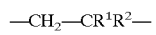     1 in which $R^1$ and $R^2$, independently of one another, are hydrogen or methyl, and b) at least 3 mol % of bivalent structural units of the formula 2

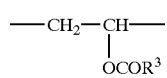     2 in which $R^3$ is saturated, branched $C_6$–$C_{16}$-alkyl which has a tertiary carbon atom, wherein $R^3$ is bonded by its tertiary carbon atom to the carboxyl function.

* * * * *